United States Patent Office 3,378,564
Patented Apr. 16, 1968

3,378,564
CERTAIN PYRIDYL TETRAZOLE DERIVATIVES
Gerald F. Holland, Groton, Conn., assignor to Chas. Pfizer & Co., Inc., New York, N.Y., a corporation of Delaware
No Drawing. Filed Dec. 15, 1964, Ser. No. 418,527
9 Claims. (Cl. 260—294.8)

This invention relates to certain novel and useful pyridine compounds. In particular it is concerned with substituted 5-(pyridyl)tetrazole and N-oxides thereof which are particularly effective as lipid regulating agents.

What is meant by the term "regulating lipid metabolism" is the ability to depress triglycerides, free fatty acids, cholesterol, lipoproteins, phospholipids, etc. in human and animal blood.

The compounds with which the present invention is concerned can be represented by the following structural formula:

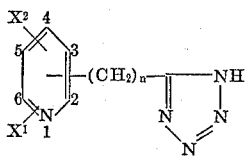

wherein $X^1$ and $X^2$ are each selected from the group consisting of H, halogen (F, Cl, Br, I), hydroxy, acetylamino, amino, alkoxy, carboalkoxy, alkylthio, mono- and dialkylamino, N-alkylcarbamyl, N,N-dialkylcarbamyl, alkylsulfonyl, said alkyl groups containing from 1 to 4 carbon atoms, trifluoromethyl, trifluoromethoxy, trifluoromethylthio, methoxymethyl, carboxy, carbamyl, alkanoyloxy containing up to 4 carbon atoms, phenyl, p-chlorophenyl, p-methylphenyl, and p-aminophenyl; $n$ is a whole number from 0 to 4, one of $X^1$ and $X^2$ is other than H; and N-oxides thereof.

The mono-substituted compounds of the present invention are represented by the formula:

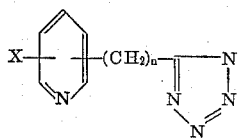

wherein X is halogen (F, Cl, Br, I), hydroxy, acetylamino, amino, alkoxy, carboalkoxy, alkylthio, mono- and dialkylamino, N-alkylcarbamyl, N,N-dialkylcarbamyl, alkylsulfonyl, said alkyl groups containing from 1 to 4 carbon atoms, trifluoromethyl, trifluoromethoxy, trifluoromethylthio, methoxymethyl, carboxy, carbamyl, alkanoyloxy containing up to 4 carbon atoms, phenyl, p-chlorophenyl, p-mehylphenyl or p-aminophenyl; $n$ is a whole number from 0 to 4 and N-oxides thereof.

Specific examples of such compounds include 5-[3-(2-methoxy)pyridyl]-tetrazole, 5-[3-(2-methylthio)pyridyl] tetrazole, 5-[3-(6-amino)pyridyl]tetrazole, 5 - [3 - (5-amino)pyridyl]tetrazole, 5-[3-(6-methylsulfonyl)pyridyl] tetrazole, and 3 - [5 - (2 - methoxy)tetrazoyl]pyridine-N-oxide.

For consistency and clarity, a numbering system for the pyridine ring has been arbitrarily chosen as shown in Formula I above in which the nitrogen atom is selected as number 1 and the subsequent carbon atoms are numbered consecutively in a counter-clockwise manner.

In accordance with the process employed for preparing these compounds, the appropriately substituted cyanopyridine compound is condensed with sodium azide and ammonium chloride in the presence of lithium chloride. The appropriately substituted cyano compounds are either known compounds or can easily be prepared by using standard organic procedures well known to those skilled in the art. The condensation step itself is most desirably conducted in dimethylformamide at ambient temperatures. In general, a slight excess of sodium azide and ammonium chloride, and approximately 0.01% by weight of lithium chloride is used, based on the cyano compound.

Recovery of the desired product from the reaction mixture is readily effected by any number of standard procedures known to those skilled in the art. For instance, the procedure followed in the herein described preparation, is as follows: The reaction mixture is filtered to remove insoluble material, and stripped free of solvent (DMF) under vacuum. The resulting residue is dissolved in a substantial amount of water, and the pH adjusted to about 4.0 with HCl solution. The precipitated product is filtered and a second crop is obtained from the mother liquor by adjusting the pH to abut 2.0 and refiltering. The product may be further purified by a recrystallization step wherein a suitable solvent, for example, water is utilized.

In addition to the procedure outlined above, several other synthetic routes are possible. For example, the corresponding derivatives may be obtained by heating a mixture of cyano compound, acetic acid, n-butanol, and sodium azide for 5 days, or by heating a mixture of cyano compound with hydrazoic acid in xylene in a Pyrex combustion tube.

Included within the scope of the compounds designated by Formula I, as defined earlier, are the corresponding N-oxides. The conversion of pyridine compounds to their respective N-oxides is a well-documented synthetic organic procedure and generally comprises oxidizing the pyridine compound with a hydrogen peroxide solution in a suitable reaction medium, for example, glacial acetic acid. The procedure which has been found to be satisfactory for the conversion of the herein disclosed substituted 5-(pyridyl)tetrazoles to correspondingly 5-tetrazolyl-pyridine-N-oxides is as follows: A mixture of a substituted 5-(pyridyl)tetrazole, glacial acetic acid, and 30% hydrogen peroxide is heated for approximately 24 hours, at a temperature from about 0 to about 100° C. The mixture is subsequently cooled, diluted with a large volume of ether, and the precipitated product is filtered. For further purification, said product may be crystallized from a suitable solvent, for example, water.

Since the compounds of this invention are amphoteric in nature, they can be converted to either acid or base addition salts by treating said compound with a substantially equimolar amount of a chosen acid or base in an aqueous solution or in a suitable organic solvent such as methanol or ethanol. When such salts are to be used for human consumption, either orally or parenterally, the acids or bases which are used to prepare the pharmaceutically acceptable addition salts must, of course, be those which necessarily form non-toxic acid addition salts. Examples of acids which provide pharmaceutically acceptable anions are hydrochloric, hydrobromic, hydroiodic, nitric, sulfuric or sulfurous, phosphoric, acetic, lactic, citric, tartaric, oxalic, succinic, maleic, gluconic, and p-toluene sulfonic.

The bases which are used to prepare the pharmaceutical acceptable base salts of the 5(pyridyl)-tetrazoles of this invention are those which form nontoxic salts containing pharmaceutically-acceptable cations, such as the alkali metal, alkaline-earth metal, ammonium or water-soluble amine addition salts like the lower alkanol-ammonium and other base salts with organic amines which are compatible with the human system. Preferred members of this group include the sodium, potassium, magnesium, calcium and ethanol-ammonium salts.

The 5-(pyridyl)tetrazole derivatives and N-oxides thereof of this invention can be administered either alone or preferably in combination with a pharmaceutically acceptable carrier. They may be combined with various pharmaceutically acceptable inert carriers in the form of tablets, capsules, lozenges, troches, hard candies, powders, sprays, aqueous suspensions or solutions, injectable solutions, elixirs, syrups, and the like. Such carriers include solid diluents or filters, sterile aqueous media and various nontoxic organic solvents. Moreover, the oral pharmaceutical compositions of this invention may be suitably sweetened and flavored by means of various agents of the type commonly employed for just such a purpose.

For purposes of parenteral administration, solutions or suspensions of the herein described tetrazole derivatives in sesame or peanut oil or in aqueous propylene glycol solutions can be employed, as well as sterile aqueous solutions of the corresponding water-soluble addition salts previously enumerated. These particular solutions are especially suited for intramuscular and subcutaneous injection purposes. The aqueous solutions, including those of the addition salts dissolved in pure distilled water, are additionally useful for intravenous injection purposes provided that their pH be properly adjusted before hand. Such solutions should also be suitably buffered, if necessary, and the liquid diluent first rendered isotonic with sufficient saline or glucose.

When administered to humans orally or parenterally, the effective average daily dose is suitably between about 0.5 g. per day and about 3 g. per day. The dosage can be taken at one time or divided dosages can be taken at different times during the day. On a body-weight basis, a dosage of about 73 to about 440 mg./kg. per day is appropriate.

The physician will determine the dosage which will be most suitable for an individual patient and it will vary with the age, the weight and response of the particular patient. The above dosages are exemplary of the average host. There can, of course, be individual cases where higher or lower dosage ranges are merited, and such are within the scope of this invention. For use in animals, e.g., dogs, rats, etc., the same routes of administration are applicable as in humans; however, on a body-weight basis, a dosage of about 10 to 500 mg./kg. per day is more preferred.

The usefulness of the herein disclosed compounds may be evident in other phases of abnormal lipid metabolism, the latter possibly accounting for the clinical problems in diabetes, pancreatitis, coronary heart disease, cerebrovascular disease, etc. Hence, the ability of tetrazoles of the instant invention to decrease or regulate lipid metabolism might find utility in the treatment of the above said diseases.

The following examples are provided by way of illustration and should not be interpreted as limiting the invention, many variations of which are possible without departing from the spirit or scope thereof.

Example I.—5-[3-(2-methoxy)pyridyl]tetrazole

A mixture of 2-methoxy-3-cyanopyridine (300 g., 2.24 M), a slight excess of sodium azide and a slight excess of ammonium chloride, lithium chloride (3.0 g.) and dry dimethylformamide (1500 ml.) is stirred for 42 hours. On completion of said period, insoluble material is filtered and the mother liquor stripped of dimethylformamide. To the resulting residue is added 4000 ml. of $H_2O$ and the pH adjusted to 4.0 with an HCl solution. The product 5-[3-(2-methoxy)pyridyl]tetrazole is obtained by filtration and a second crop is obtained by adjusting the pH of the filtrate to 2.0 and re-filtering. The combined crops represent a substantial yield of product. Recrystallization from water gives a product, M.P. 241° C. dec.

Analysis.—Calcd. for $C_7H_7ON_5$: percent C, 47.45; percent H, 3.98; percent N, 39.53. Found: percent C, 46.85; percent H, 4.03; percent N, 39.86.

Example II.—5-[3-(2-methylmercapto)pyridyl]tetrazole

The procedure of Example I is repeated for the preparation of 5-[3-(2-methylmercapto)pyridyl]tetrazole except 2-methylthio-3-cyanopyridine is used in lieu of 2-methoxy-3-cyanopyridine. The product is obtained in substantial yields. Recrystallization from water gives a compound, M.P. 212–213° C. dec.

Analysis.—Calcd. for $C_6H_5N_5S$: percent C, 43.52; percent H, 3.65; percent N, 36.26. Found: percent C, 43.53; percent H, 3.84; percent N, 35.70.

Example III.—5-[3-(6-amino)pyridyl]tetrazole

The procedure of Example I is repeated for the preparation of 5-[3-(6-amino)pyridyl]tetrazole except 3-cyano-6-amino pyridine is used in lieu of 2-methoxy-3-cyanopyridine. Substantially the same results are obtained. The product has a M.P. 309° C. dec.

Analysis.—Calcd. for $C_6H_6N_6$: percent C, 44.44; percent H, 3.74. Found: percent C, 43.99; percent H, 4.20.

Example IV.—5-[3-(5-amino)pyridyl]tetrazole

The procedure of Example I is repeated for the preparation of 5-[3-(5-amino)pyridyl]tetrazole except 3-cyano-5-amino pyridine is used in lieu of 2-methoxy-3-cyanopyridine. Substantially the same results are obtained. The product has a M.P. 322° C. dec.

Analysis.—Calcd. for $C_6H_6N_6$: percent C, 44.44; percent H, 3.74. Found: percent C, 44.45; percent H, 4.18.

Example V.—5-[3-(6-methylsulfonyl)pyridyl]tetrazole

The procedure of Example I is repeated for the preparation of 5-[3-(6-methylsulfonyl)pyridyl]tetrazole except 3-cyano-6-methylsulfonyl pyridine is used in lieu of 2-methoxy-3-cyanopyridine. Substantially the same results are obtained. The product has a M.P. 198.5–200° C. dec.

Analysis.—Calcd. for $C_7H_7N_5SO_2$: Percent C, 37.34; percent H, 3.13. Found: Percent C, 37.56; percent H, 3.64.

Example VI.—5-[3-(6-acetylamino)pyridyl]tetrazole

The procedure of Example I is repeated for the preparation of 5-[3-(6-acetylamino)pyridyl]tetrazole except 6-acetylamino-3-cyanopyridine is used in lieu of 2-methoxy-3-cyanopyridine and a substantial amount of product is obtained. The product has a M.P. 281° C. dec.

Analysis.—Calcd. for $C_8H_7N_6O$: Percent C, 47.29; percent H, 3.95. Found: Percent C, 47.27; percent H, 4.45.

Example VII.—5-[3-(4-trifluoromethyl,6-methyl) pyridyl]tetrazole

The procedure of Example I is repeated for the preparation of 5-[3-(4-trifluoromethyl-6-methyl)pyridyl]tetrazole except 4-trifluoromethyl-6-methyl-3-cyanopyridine is used in place of 2-methoxy-3-cyanopyridine. A substantial amount of product, isolated as the hydrochloride salt, is obtained, M.P. 204° C. dec.

Analysis.—Calcd. for $C_8H_{17}ClF_3N_5$: Percent C, 36.17; percent H, 2.66. Found: Percent C, 36.55; percent H, 2.91.

Example VIII.—5-[3-(4-methoxymethyl-6-methyl) pyridyl]tetrazole

The procedure of Example I is repeated for the preparation of 5-[3-(4-methoxymethyl-6-methyl)pyridyl]tetrazole except 4-methoxymethyl-6-methyl-3-cyanopyridine is used in place of 2-methoxy-3-cyanopyridine. A substantial amount of product, isolated as the hydrochloride salt, is obtained, M.P. 203–204° C. dec.

Analysis.—Calcd. for $C_9H_{12}N_5OCl$: Percent C, 44.72; percent H, 5.00. Found: Percent C, 44.86; percent H, 5.18.

Example IX

The procedure of Example I is repeated for the preparation of the following compounds wherein the ensuing cyanopyridine derivatives are used in lieu of 2-methoxy-3-cyanopyridine and the corresponding products are obtained in substantial amounts.

| Cyanopyridine derivative | Product |
| --- | --- |
| 6-hydroxy-2-cyanopyridine | 5-[2-(6-hydroxy)pyridyl]tetrazole. |
| 5-iodi-2-cyanopyridine | 5-[2-(5-iodo)pyridyl]tetrazole. |
| 4-methylthio-2-cyanopyridine | 5-[2-(4-mrthylthio)pyridyl]tetrazole. |
| 3-dimethylamino-2-cyanopyridine | 5-[2-(3-dimethylamino)pyridyl]tetrazole. |
| 4,5-dichloro-2-cyanopyridine | 5-[2-(4,5-dichloro)pyridyl]tetrazole. |
| 6-carboxy-2-pyridylacetonitrile | 5-[2-(6-carboxy)pyridylmethyl]tetrazole. |
| 5-fluoro-2-pyridylvaleronitrile | 5-[2-(5-fluoro)pyridylbutyl]tetrazole. |
| 4-trifluoromethoxy-2-pyridyl-butyronitrile. | 5-[2-(4-trifluoromethoxy)pyridylpropyl]tetrazole. |
| 3-p-aminophenyl-2-pyridylpropionitrile. | 5-[2-(3-p-aminophenyl)pyridylethyl]tetrazole. |
| 4,5-diacetoxy-2-pyridylacetonitrile | 5-[2-(4,5-diacetoxy)pyridylmethyl]tetrazole. |
| 6-butylamino-3-cyanopyridine | 5-[3-(6-butylamino)pyridyl]tetrazole. |
| 5-bromo-3-cyanopyridine | 5-[3-(5-bromo)pyridyl]tetrazole. |
| 5-trifluoromethylthio-3-cyanopyridine. | 5-[3-(5-trifluoromethylthio)pyridyl]tetrazole. |
| 6-dibutylcarbamyl-3-pyridylacetonitrile. | 5-[3-(6-dibutylcarbamyl)pyridylmethyl]tetrazole. |
| 6-butylsulfoxy-3-pyridylbutyronitrile. | 5-[3-(6-butylsulfoxy)pyridylpropyl]tetrazole. |
| 6-butoxy-3-pyridylvaleronitrile | 5-[3-(6-butoxy)pyridylbutyl]tetrazole. |
| 6-butylthio-3-pyridylpropionitrile. | 5-[3-(6-butylthio)pyridylethyl]tetrazole. |
| 6-butylsulfonyl-3-pyridyl-propionitrile. | 5-[3-(6-butylsulfonyl)pyridylethyl]tetrazole. |
| 4,6-dicarbomethoxy-3-cyanopyridine. | 5-[3-(4,6-dicarbomethoxy)pyridyl]tetrazole. |
| 5-carbamyl,6-trifluoromethoxy-3-cyanopyridine. | 5-[3-(5-carbamyl,6-trifluoromethoxy)pyridyl]tetrazole. |
| 5-dimethylcarbamyl-3-cyanopyridine. | 5-[3-(5-dimethylcarbamyl)pyridyl]tetrazole. |
| 5-ethylsulfoxy-3-cyanopyridine | 5-[3-(5-ethylsulfoxy)pyridyl]tetrazole. |
| 5-carbobutoxy-3-cyanopyridine | 5-[3-(5-carbobutoxy)pyridyl]tetrazole. |
| 4-carboxy-3-cyanopyridine | 5-[3-(4-carboxy)pyridyl]tetrazole. |
| 5-fluoro-3-cyanopyridine | 5-[3-(5-fluoro)pyridyl]tetrazole. |
| 4-bromo,6-acetoxy-3-cyanopyridine. | 5-[3-(4-bromo,6-acetoxy)pyridyl]tetrazole. |
| 6-propylcarbamyl-4-cyanopyridine. | 5-[4-(6-propylcarbamyl)pyridyl]tetrazole. |
| 6-phenyl-4-cyanopyridine | 5-[4-(6-phenyl)pyridyl]tetrazole. |
| 6-p-chlorophenyl-4-cyanopyridine | 5-[4-(6-p-chlorophenyl)pyridyl]tetrazole. |
| 6-p-methylphenyl-4-cyanopyridine | 5-[4-(6-p-methylphenyl)pyridyl]tetrazole. |
| 6-butyroxy-4-cyanopyridine | 5-[4-(6-butyroxy)pyridyl]tetrazole. |
| 5-acetylamino-4-pyridylacetonitrile. | 5-[4-(5-acetylamino)pyridylmethyl]tetrazole. |
| 6-dibutylamino-4-pyridylvaleronitrile. | 5-[4-(6-dibutylamino)pyridylbutyl]tetrazole. |
| 6.propylcarbamyl-4-pyridylbutyronitrile. | 5-[4-(6-propylcarbamyl)pyridylpropyl]tetrazole. |
| 2,6-ditrifluoromethyl-4-pyridylpropionitrile. | 5-[4-(2,6-ditrifluoromethyl)pyridylethyl]tetrazole. |

Example X.—3-[5-(2-methoxy)tetrazoyl]pyridine-N-oxide

A mixture of 5-[3-(2-methoxy)pyridyl]tetrazole (15 g.), glacial acetic acid (75 ml.) and 30% hydrogen peroxide (225 ml.) is heated at 90° C. for 24 hrs. After this time period, the reaction mixture is cooled and diluted with a large volume of ether. The precipitate 3-[5-(2-methoxy)tetrazoyl]pyridine-N-oxide which forms is filtered and recrystallized from water to yield a substantial amount of product.

Example XI

The procedure of Example X is repeated using stoichiometric equivalent amounts for the preparation of 3-[5-(2-methylmercapto)tetrazoyl]pyridine-N-oxide wherein 5-[3-(2-methylmercapto)pyridyl]tetrazole is used in lieu of 5-[3-(2-methoxy)pyridyl]tetrazole and substantially the same results are obtained. Similarly, the N-oxides of 5[3-(6-amino)pyridyl]tetrazole, 5-[3-(5-amino)pyridyl]tetrazole, 5-[3-(6-methylsulfonyl)pyridyl]tetrazole, 5-[3-(6-acetylamino)pyridyl]tetrazole, 5-[3-(4-trifluoromethyl,6-methyl)-pyridyl]tetrazole and 5-[3-(4-methoxymethyl,6-methyl)pyridyl]tetrazole are prepared following the procedure of Example X and substantial yield of respective product is obtained.

Example XII

The N-oxides of the compounds tabulated in Example XI are prepared using the experimental procedure described in Example IX wherein stoichiometric equivalent amounts of said compounds are utilized in lieu of 5-[3-(2-methoxy)pyridyl]tetrazole and substantially the same results are obtained.

Example XIII

The 5-(pyridyl)tetrazole derivatives disclosed herein may be converted to their acid addition salts by the following general procedure: To a methanolic solution containing the 5-(pyridyl)tetrazole compound (1 M) is added a stoichiometric equivalent amount of a suitable acid. The resulting solution is subsequently stripped free of solvent and the precipitate, i.e., acid addition salt is filtered and dried. Other suitable solvents, for example, ethanol, water or mixtures thereof may be utilized. The following acid addition salts are typical examples prepared using the above said procedure and substantial yields of product are obtained:

| Compound | Acid | Acid Addition Salt |
| --- | --- | --- |
| 5-[3-(2-methoxy)pyridyl]tetrazole. | HCl | 5-[3-(2-methoxy)pyridyl]tetrazole hydrochloride. |
| 5-[3-(2-methylmercapto)pyridyl] tetrazole. | HBr | 5-[3-(2-methylmercapto)pyridyl]tetrazole hydrobromide. |
| 5-[3-(5-amino)pyridyl]tetrazole. | HI | 5-[3-(5-amino)pyridyl]tetrazole hydroiodide. |
| 5-[3-(6-acetylamino)pyridyl] tetrazole. | Acetic Acid. | 5-[3-(6-acetylamino)pyridyl]tetrazole acetate. |
| 5-[3-(4-trifluoromethyl,6-methyl)pyridyl]tetrazole. | Phosphoric Acid. | 5-[3-(4-trifluoromethyl,6-methyl)pyridyl] tetrazole phosphate. |

Example XIV

The hydrochloride, hydrobromide and hydroiodide acid addition salts of those compounds enumerated in Example IX and N-oxides thereof are prepared following the procedure of Example XIII with comparable results.

Example XV

The 5-(pyridyl)tetrazole derivatives disclosed herein may be converted to their base addition salts by the following general procedure: To a water solution containing the 5-(pyridyl)tetrazole compound (1 M) is added a stoichiometric equivalent amount of a suitable base. The resulting solution is subsequently stripped free of solvent and the precipitate, base addition salt, is filtered and dried. The following base addition salts are typical examples prepared using the above described procedure and substantial yields of product are obtained.

| Compound | Base | Base Addition Salt |
| --- | --- | --- |
| 5-[3-(methoxy)pyridyl]tetrazole. | NaOH | Sodium salt of 5-[3-(methoxy)pyridyl]tetrazole. |
| 5-[3-(2-methylmercapto)pyridyl]tetrazole. | KOH | Potassium salt of 5-[3-(2-methylmercapto)pyridyl]tetrazole. |
| 5-[3-(5-amino)pyridyl]tetrazole. | Ca(OH)$_2$ | Calcium salt of 5-[3-(5-amino)pyridyl]tetrazole. |
| 5-[3-(6-acetylamino)pyridyl]tetrazole. | Mg(OH)$_2$ | Magnesium salt of 5-[3-(6-acetylamino)pyridyl]tetrazole. |
| 5-[3-(4-trifluoromethyl,6-methyl)pyridyl]tetrazole. | Ammonium hydroxide. | Ammonium salt of 5-[3-(4-trifluoromethyl,6-methyl)pyridyl]tetrazole. |
| 5-[3-(4-methoxymethyl,6-methyl)pyridyl]tetrazole. | Monoethanolamine. | Monoethanolamine salt of 5-[3-(4-methoxymethyl,6-methyl)pyridyl]tetrazole. |

Example XVI

The sodium, potassium, calcium, magnesium and ammonium salts of those compounds enumerated in Example IX and N-oxides thereof are prepared following the procedure of Example XV with comparable results.

What is claimed is:

1. A compound selected from the group consisting of those of the formula:

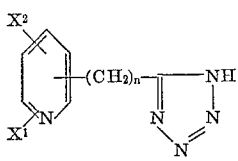

wherein $X^1$ is selected from the group consisting of halogen, hydroxy, acetylamino, amino, alkoxy, carboalkoxy, alkylthio, mono- and dialkylamino, N-alkylcarbamyl, N,N-dialkylcarbamyl, alkylsulfonyl, said alkyl groups containing from 1 to 4 carbon atoms, trifluoromethyl, trifluoromethoxy, trifluoromethylthio, methoxymethyl, carboxy, carbamyl, alkanoyloxy containing up to 4 carbon atoms, phenyl, p-chlorophenyl, p-methylphenyl and p-aminophenyl; $X^2$ is selected from the group consisting of halogen, alkanoyloxy containing from 1–4 carbon atoms, carboalkoxy containing from 2 to 5 carbon atoms, carbamyl, N-alkyl carbamyl and N,N-dialkylcarbamyl wherein said alkyl groups contain from 1–4 carbon atoms and trifluoromethyl; $n$ is a whole number from 0 to 4; and N-oxides thereof.

2. A pharmaceutically acceptable acid addition salt of a compound of claim 1.

3. A compound selected from the group consisting of those of the formula:

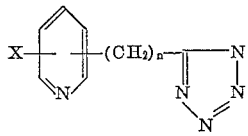

wherein X is halogen, hydroxy, acetylamino, amino, alkoxy, carboalkoxy, alkylthio, mono- and dialkylamino, N-alkylcarbamyl, N,N-dialkylcarbamyl, alkylsulfonyl, said alkyl groups containing from 1 to 4 carbon atoms, trifluoromethyl, trifluoromethoxy, trifluoromethylthio, methoxymethyl, carboxy, carbamyl, alkanoyloxy containing up to 4 carbon atoms, phenyl, p-chlorophenyl, p-methylphenyl or p-aminophenyl; $n$ is a whole number from 0 to 4 and N-oxides thereof.

4. A pharmaceutically acceptable acid addition salt of a compound of claim 3.

5. 5-[3-(2-methoxy)pyridyl]tetrazole.
6. 5-[3-(2-methylthio)pyridyl]tetrazole.
7. 5-[3-(6-amino)pyridyl]tetrazole.
8. 5-[3-(5-amino)pyridyl]tetrazole.
9. 5-[3-(6-methylsulfonyl)pyridyl]tetrazole.

References Cited
UNITED STATES PATENTS 2,714,595   9/1952   Bernstein et al. _____ 260—295

OTHER REFERENCES

VanDerBurg: Rec. Trav. Chim., vol. 74, pp. 257–62 (1955).

McManus et al.: J. Org. Chem., vol. 24, p. 1462–4 (1959).

JOHN D. RANDOLPH, *Primary Examiner.*

WALTER A. MODANCE, *Examiner.*

A. L. ROTMAN, *Assistant Examiner.*